United States Patent
Harriman et al.

(10) Patent No.: US 9,979,294 B1
(45) Date of Patent: May 22, 2018

(54) DC-DC CONVERTER WITH GATE CHARGE RE-USE

(71) Applicant: SEMICONDUCTOR COMPONENTS INDUSTRIES, LLC, Phoenix, AZ (US)

(72) Inventors: Paul Jay Harriman, Belfair, WA (US); Andrea Bonelli, Nice (FR); Dominique Romeo, Montauban (FR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days. days.

(21) Appl. No.: 15/474,414

(22) Filed: Mar. 30, 2017

(51) Int. Cl.
*H02M 3/156* (2006.01)
*H02M 3/158* (2006.01)
*H02M 1/08* (2006.01)
*H02M 1/00* (2006.01)

(52) U.S. Cl.
CPC ............ *H02M 3/158* (2013.01); *H02M 1/08* (2013.01); *H02M 2001/0048* (2013.01)

(58) Field of Classification Search
CPC .... H02M 3/156; H02M 3/158; H02M 3/1588; H03K 17/08; H03K 17/081; H03K 17/08104; H03K 17/0812; H03K 17/0814; H03K 17/082; H03K 17/0822
See application file for complete search history.

(56) References Cited

U.S. PATENT DOCUMENTS

| | | | | |
|---|---|---|---|---|
| 6,636,024 B2* | 10/2003 | Zametzky | ............ | H02M 1/088 323/223 |
| 7,076,070 B2* | 7/2006 | Pearce | ............... | H01L 21/8234 257/368 |
| 7,230,302 B2* | 6/2007 | Lotfi | ..................... | H01L 21/761 257/335 |
| 8,072,246 B2* | 12/2011 | Nagasawa | ............ | H02M 3/156 327/110 |
| 8,558,525 B1 | 10/2013 | Jain | | |
| 2017/0093283 A1* | 3/2017 | Leoncini | ............... | H02M 3/158 |

OTHER PUBLICATIONS

S. Chahar et al., "Analysis and Design of a Low Voltage Si LDMOS Transistor," International Journal of Latest Research in Engineering and Technology, vol. 1, Issue 3, Aug. 2015, pp. 65-69.

* cited by examiner

*Primary Examiner* — Gary L Laxton
(74) *Attorney, Agent, or Firm* — Polansky & Associates, P.L.L.C.; Paul J. Polansky (57) ABSTRACT

A DC-DC converter includes an output power stage and a driver circuit. The output stage switches an input voltage to a switch node using a first transistor in response to a top-gate signal received at a top-gate node, and the switch node to ground using a second transistor in response to a bottom-gate signal received at a bottom-gate node. The driver circuit that provides the top- and bottom-gate signals in response to high- and low-side switch signals, respectively, activates the top-gate signal by actively regulating the top-gate node to a first voltage between a threshold voltage and a breakdown voltage of the first transistor using charge from the bottom-gate node, and activates the bottom-gate signal by actively regulating a second voltage provided to the bottom-gate node between a threshold voltage and a breakdown voltage of the second transistor using charge from the top-gate node.

23 Claims, 6 Drawing Sheets

DC-DC CONVERTER WITH GATE CHARGE RE-USE

FIELD OF THE DISCLOSURE

The present disclosure relates generally to power conversion circuits, and more particularly to DC-DC converters.

BACKGROUND

DC-to-DC converters are power converters that convert one direct current (DC) voltage into another DC voltage. While there are several DC-DC converter topologies such as low dropout (LDO), capacitive, and hysteretic, a common approach is a switch mode DC-DC converter. Switch mode DC-DC converters use a pulse width modulated (PWM) switch in series with an inductive element and change the duty cycle of the switch to determine the output voltage, and use a feedback voltage to regulate the output voltage to a desired level.

If the DC-DC converter converts an input voltage from a higher voltage to a lower output voltage, it is known as a buck converter. A typical switch mode buck converter alternatively connects the first terminal of an inductor to an input voltage or to ground to regulate the output voltage at the second terminal of the inductor to the desired level.

It is desirable to operate switch mode DC-DC converters at higher switching frequencies to reduce the size of output filters. However system efficiency goes down at higher switching frequencies due to increased switching losses associated with the metal-oxide-semiconductor field effect transistors (MOSFETs) used to switch current through the inductor. These switching losses are especially undesirable in low-voltage battery powered equipment because the extra switching losses decrease battery life.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
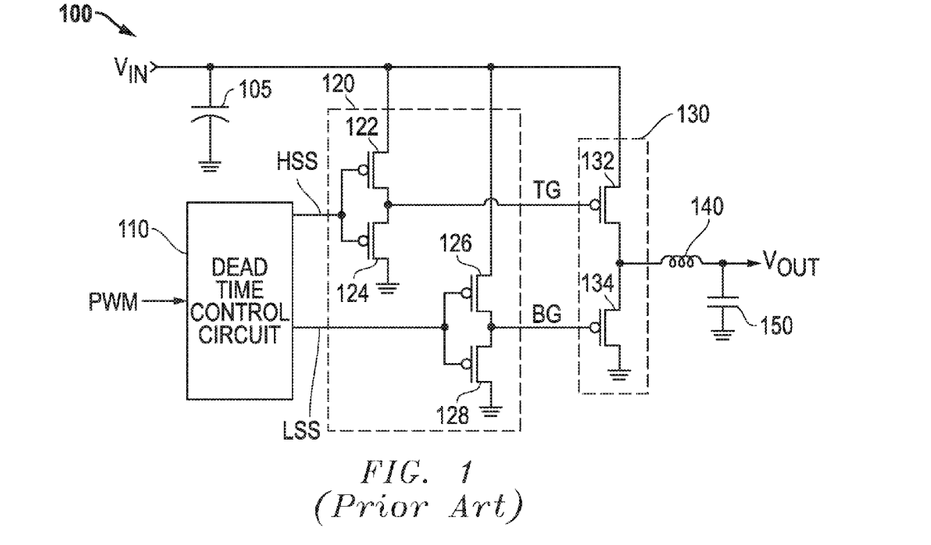
FIG. 1 illustrates in partial block diagram and partial schematic form a DC-DC converter known in the prior art.

FIG. 1 illustrates in partial block diagram and partial schematic form a DC-DC converter 100 known in the prior art. DC-DC converter 100 includes an input capacitor 105, a dead-time control circuit 110, a driver circuit 120, an output power stage 130, an inductor 140, and a capacitor 150. Input capacitor 105 has a first terminal for receiving an input voltage labeled "$V_{IN}$", and a second terminal connected to ground. As used herein, "ground" is a voltage reference forming a circuit common and having a nominal voltage of 0 volts, and it may be implemented with earth ground or another suitable voltage such as an analog ground or a virtual ground.

Dead-time control circuit 110 has an input terminal for receiving a pulse width modulation signal labeled "PWM", a first output for providing a high-side switch signal labeled "HSS", and a second output for providing a low-side switch signal labeled "LSS". Driver circuit 120 includes a P-channel metal-oxide-semiconductor (MOS) transistor 122, an N-channel MOS transistor 124, a P-channel MOS transistor 126, and an N-channel MOS transistor 128. Transistor 122 has a source for receiving $V_{IN}$, a gate for receiving signal HSS, and a drain for providing a signal labeled "TG". Transistor 124 has a drain connected to the drain of transistor 122, a gate for receiving signal HSS, and a source connected to ground. Transistor 126 has a source for receiving $V_{IN}$, a gate for receiving signal LSS, and a drain for providing a signal labeled "BG". Transistor 128 has a drain connected to the drain of transistor 126, a gate for receiving signal LSS, and a source connected to ground. Output power stage 130 includes a P-channel MOS transistor 132, and an N-channel MOS transistor 134. Transistor 132 has a source for receiving $V_{IN}$, a gate for receiving the TG signal, and a drain. Transistor 134 has a drain connected to the drain of transistor 132, a gate for receiving the TG signal, and a source connected to ground.

Inductor 140 has a first terminal connected to the drains of transistors 132 and 134, and a second terminal for providing an output voltage labeled "$V_{OUT}$" to a load, not shown in FIG. 1. Capacitor 150 has a first terminal connected to the second terminal of inductor 140, and a second terminal connected to ground.

DC-DC converter 100 is a buck converter that converts a relatively large input voltage $V_{IN}$, for example between 2.5 and 5.0 volts, into a smaller output voltage $V_{OUT}$, for example between 0.3 and 1.3 volts. During a first part of a switching cycle, driver circuit 120 makes transistor 132 conductive to drive current into inductor 140 and to increase the magnetic flux stored in inductor 140, while transistor 134 is non-conductive. During a second part of the switching cycle, driver circuit 120 makes transistor 134 conductive to decrease the flux stored in inductor 140 and drive current into the load and capacitor 150, while transistor 132 is non-conductive. DC-DC converter 100 operates in a closed loop to regulate output voltage $V_{OUT}$ to a desired level by changing the duty cycle of the PWM signal using conventional components that are not shown in FIG. 1. Dead-time control circuit 110 ensures a safe non-overlap time between the first and second periods so that transistors 132 and 134 are not both conductive at the same time, and thereby to avoid shoot-through currents.

Transistors 132 and 134 are power MOS transistors with large gate areas so they can switch large amounts of current. Because of the large gate areas, output power stage 130 repeatedly charges and discharges large gate capacitances on the gates of transistors 132 and 134. The amount of power consumed with the charging and discharging operations increases as switching frequency increases.

Dead-time control circuit 110 and driver circuit 120 operate as follows. During the first part of the switching cycle, dead-time control circuit 110 makes transistor 122 non-conductive while transistor 124 is conductive to form a conductive path from the gate of transistor 132 to ground to drain the charge off the gate of transistor 132 and lower the voltage on the gate, thereby making it conductive. Dead-time control circuit 110 also makes transistor 126 non-conductive and transistor 128 conductive to drain the charge off the gate of transistor 134 to ground and lower the voltage on the gate, thereby making it non-conductive. Thus during the first part of the switching cycle, driver circuit 120 makes transistor 132 conductive and transistor 134 non-conductive to drive current into inductor 140. Around the end of the first part of the switching cycle, dead-time control circuit 110 makes transistor 124 non-conductive and transistor 122 conductive to charge the gate of transistor 132 to a voltage high enough to make transistor 132 non-conductive, while keeping transistor 134 non-conductive.

During the second part of the switching cycle, dead-time control circuit 110 makes transistor 126 conductive and transistor 128 is non-conductive, and driver circuit 120 forms a conductive path from $V_{IN}$ to the gate of transistor 134. This conductive path charges the gate of transistor 134 and makes it conductive. Thus driver circuit 120 makes transistor 134 conductive to connect the first terminal of inductor 140 to ground, while transistor 132 remains non-conductive. Around the end of the second portion of the switching cycle, dead-time control circuit 110 makes transistor 126 non-conductive and transistor 128 conductive to drain the charge off the gate of transistor 134 to ground.

Dead-time control circuit 110 repeats this pattern in subsequent switching cycles. The voltage control loop changes the duty cycle of the PWM signal to keep $V_{OUT}$ regulated to a desired level.

For even moderate power applications, this repeated charging and discharging of the gates of transistors 132 and 134 results in significant power consumption that tends to decrease battery life. The switching losses are proportional to the switching frequency, and the increased power consumption offsets the other benefits of using a higher switching frequency. Switching power losses $P_{SW}$ can be estimated as shown in Equation [1] below:

$$P_{SW} = \frac{1}{2}(C_{HSS}+C_{LSS})V^2 f\ CV^2 f \quad [1]$$

in which $C_{HSS}$ is the gate capacitance of the high-side switch, $C_{LSS}$ is the gate capacitance of the low-side switch, V is the input voltage, and f is the switching frequency, and $C=C_{HSS} C_{LSS}$.

Figure 2:
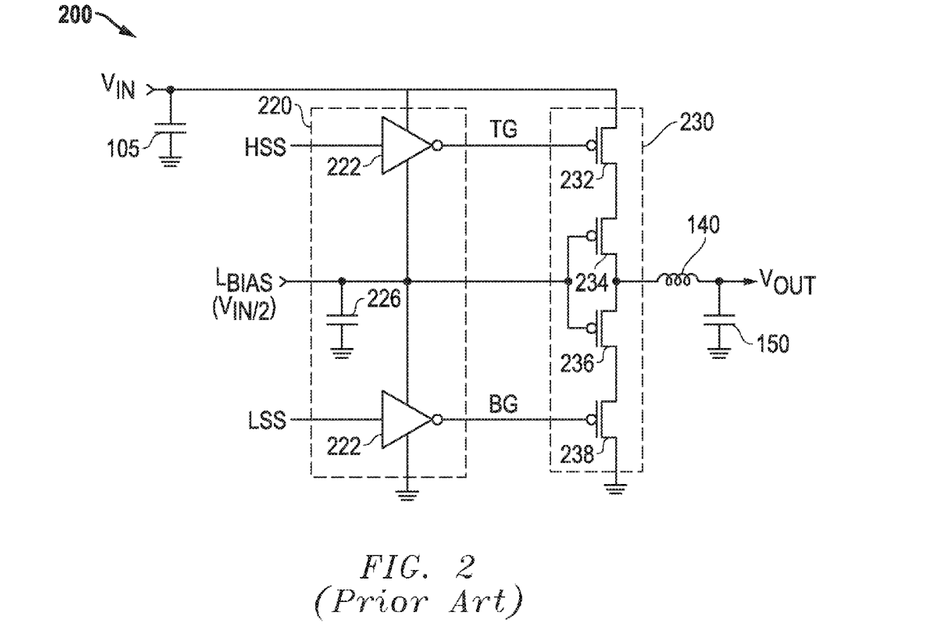
FIG. 2 illustrates in partial block diagram and partial schematic form a DC-DC converter with charge sharing known in the prior art.

FIG. 2 illustrates in partial block diagram and partial schematic form a DC-DC converter 200 with charge sharing known in the prior art. DC-DC converter 200 includes input capacitor 105, a driver circuit 220, an output power stage 230, inductor 140, and capacitor 150.

Driver circuit 220 includes a high-side driver 222, a low-side driver 224, and a capacitor 226. High-side driver 222 has an input for receiving signal HSS, an output, a positive power supply terminal for receiving $V_{IN}$, and a negative power supply terminal. Low-side driver 224 has an input for receiving signal LSS, an output, a positive power supply terminal connected to the negative supply terminal of high-side driver 222, and a negative power supply terminal connected to ground. Capacitor 226 has a first terminal connected to the negative supply terminal of high-side driver 222 and to the positive supply terminal of low-side driver 224 and receiving a bias voltage labeled "$V_{BIAS}$" having a nominal value of $V_{IN}/2$, and a second terminal connected to ground.

Output power stage 230 includes P-channel MOS transistors 232 and 234, and N-channel MOS transistors 236 and 238. Transistor 232 has a source for receiving $V_{IN}$, a gate connected to the output of high-side driver 222, and a drain. Transistor 234 has a source connected to the drain of transistor 232, a gate connected to the first terminal of capacitor 226, and a drain. Transistor 236 has a drain connected to the drain of transistor 234, a gate connected to the first terminal of capacitor 226, and a source. Transistor 238 has a drain connected to the source of transistor 236, a gate connected to the output of low-side driver 224, and a drain connected to ground.

DC-DC converter 200 uses a stacked cascode design in which switching transistors 232 and 238 are cascoded with transistors 234 and 236. The dead-time control circuit and driver circuit 220 operate as follows. During the first part of the switching cycle, the dead-time control circuit provides each of signals HSS and LSS in a high state. High-side driver 222 discharges the gate of transistor 232 to a voltage of $V_{IN}/2$, making transistor 232 conductive. Low-side driver 224 discharges the gate of transistor 238 to ground, keeping transistor 238 non-conductive. Transistors 234 and 236 are cascode transistors that reduce the voltage swings on the drains of their respective transistors. Around the end of the first part of the switching cycle, the dead-time control circuit makes transistor 232 non-conductive by charging the gate of transistor 232 to a voltage high enough to make transistor 232 non-conductive, while keeping transistor 238 non-conductive.

During the second part of the switching cycle, the dead-time control circuit forms a conductive path from the power supply voltage terminal of low-side driver 224 to the gate of transistor 238 to provide $V_{IN}/2$. This conductive path charges the gate of transistor 238 and makes it conductive, and driver circuit 220 makes transistor 238 conductive to connect the first terminal of inductor 140 to ground, while transistor 232 remains non-conductive. Around the end of the second part of the switching cycle, the dead-time control circuit drives LSS low, causing low-side driver 224 to provide charge the gate of transistor 238 and to provide a voltage of $V_{IN}/2$ to the gate of transistor 238.

Thus driver circuit 220 reduces the voltage swing on the gates of the switching transistors in output power stage 230 by about half, reducing switching losses. Nonetheless, the transistors in output power stage 230 need to be able to withstand and be rated for voltage swings of at least about $V_{IN}/2$.

Figure 3:
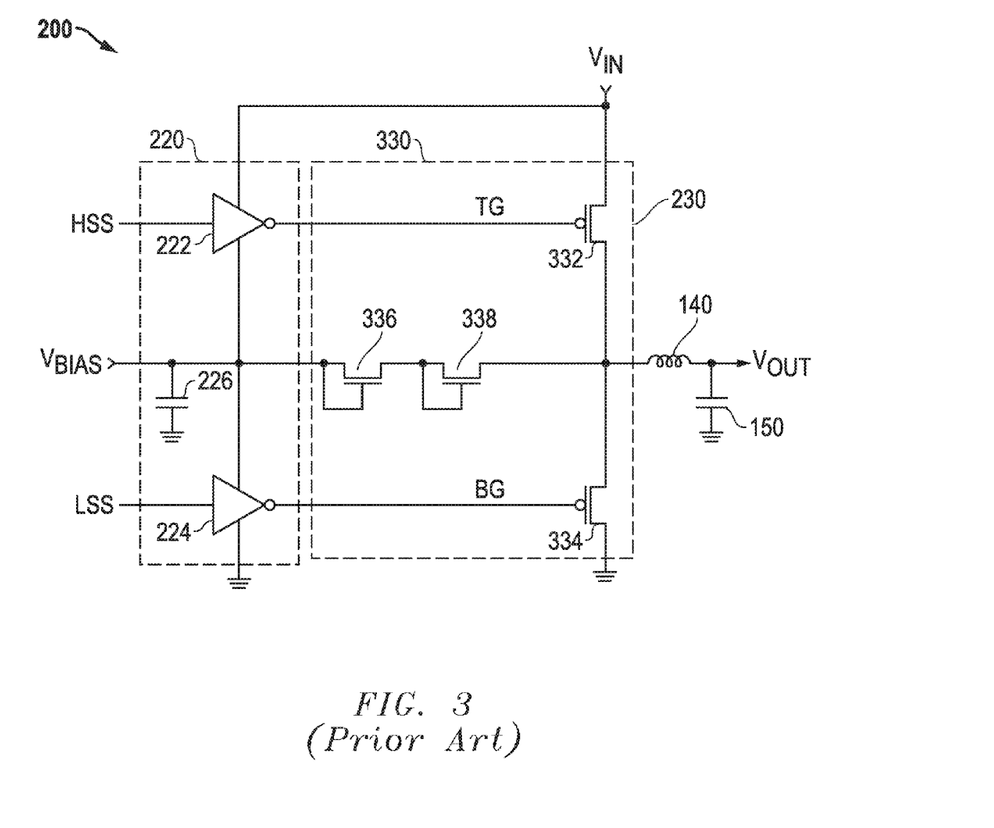
FIG. 3 illustrates in partial block diagram and partial schematic form another DC-DC converter with charge sharing known in the prior art.

FIG. 3 illustrates in partial block diagram and partial schematic form another DC-DC converter 300 with charge sharing known in the prior art. DC-DC converter 300 includes driver circuit 220, inductor 140, and capacitor 150 as shown in FIG. 2, but uses a different output power stage 330 that will now be described.

Output power stage 330 includes a P-channel MOS transistor 332, an N-channel MOS transistor 334, and diode-connected N-channel MOS transistors 336 and 338. Transistor 332 has a source for receiving $V_{IN}$, a gate for receiving the TG signal, and a drain connected to the first terminal of inductor 140. Transistor 334 has a drain connected to the drain of transistor 332 and to the first terminal of inductor 140, a gate for receiving the BG signal, and a source connected to ground. Transistor 336 has a drain connected to the first terminal of capacitor 226, a gate connected to the drain thereof, and a source. Transistor 338 has a drain connected to the source of transistor 336, a gate connected to the drain, and a source connected to the drains of transistors 332 and 334 and to the first terminal of inductor 140.

DC-DC converter 300 provides gate charge re-use to reduce the switching losses. In addition, transistors 332 and 334 are high-voltage transistors that are able to withstand a voltage swing of, for example 1.8 volts. However the use of a node biased by $V_{BIAS}$ with transistors 332 and 334 greatly increases their on resistances since they are only biased to $V_{IN}/2$, with corresponding increases in power consumption due to conduction losses because of the high on resistance. In addition, the gate discharge path is not balanced between the high- and low-side transistors, and excess gate charge current is dumped onto the output stage switch node at the drains of transistors 332 and 334. In particular, DC-DC converter 300 drains the charge on the gate of transistor 332 through diode-connected transistors 336 and 338 into the switch node at the drains of transistors 332 and 334.

Figure 4:
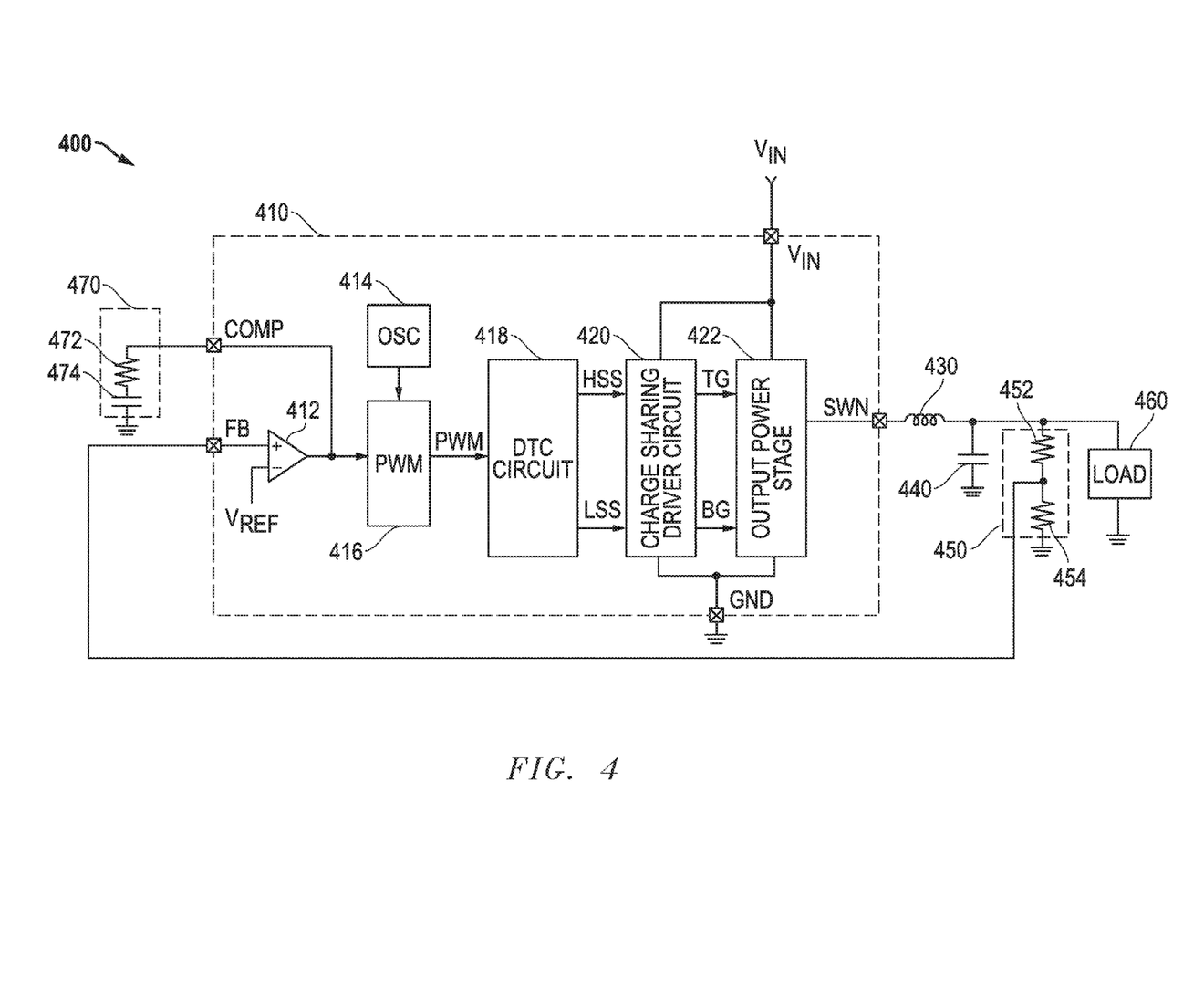
FIG. 4 illustrates in partial block diagram and partial schematic form a power conversion system having a DC-DC converter according to various embodiments of the present invention.

FIG. 4 illustrates in partial block diagram and partial schematic form a DC-DC power conversion system 400 having a DC-DC converter 410 according to various embodiments of the present invention. In addition to DC-DC converter 410, DC-DC power conversion system 400 also includes an inductor 430, a capacitor 440, a feedback network 450, a load 460, and a compensation network 470.

DC-DC converter 410 is an integrated circuit having a set of terminals, an error amplifier 412, an oscillator 414, a pulse width modulator 416, a dead-time control circuit 418, a driver circuit 420, and an output power stage 422. Error amplifier 412 has a non-inverting input connected to a feedback terminal labeled "FB", an inverting input for receiving a reference voltage labeled "VREF", and an output connected to a compensation terminal labeled "COMP". Oscillator 414 has an output for providing a clock signal. The clock signal may be, for example a periodic sawtooth signal. Pulse width modulator 416 has a first input connected to the output of error amplifier 412, a second input connected to the output of oscillator 414, and an output for providing the PWM signal. Dead-time control circuit has an input connected to the output of pulse width modulator 416 for receiving the PWM signal, a first output for providing the HSS signal, and a second output for providing the LSS signal. Driver circuit 420 has a first input for receiving the HSS signal, a second input for receiving the LSS signal, a first output for providing the TG signal, a second output for providing the BG signal, a positive power supply terminal for receiving the $V_{IN}$ voltage from a corresponding integrated circuit terminal, and a negative power supply terminal connected to a ground terminal labeled "GND". Output power stage 422 has a first input for receiving the TG signal, a second input for receiving the BG signal, an output connected to a switch node terminal labeled "SWN", a positive power supply terminal for receiving the $V_{IN}$ signal, and a negative power supply terminal for receiving connected to a ground terminal labeled "GND".

Inductor 430 has a first terminal connected to the SWN terminal of DC-DC converter 410, and a second terminal for providing output voltage $V_{OUT}$. Capacitor 440 has a first terminal connected to the second terminal of inductor 430, and a second terminal connected to ground.

Feedback network 450 includes resistors 452 and 454. Resistor 452 has a first terminal connected to the second terminal of inductor 430, and a second terminal connected to the non-inverting input of error amplifier 412 through terminal FB. Resistor 454 has a first terminal connected to the second terminal of resistor 452, and a second terminal connected to ground. Load 460 has a first terminal connected to the second terminal of inductor 430, and a second terminal connected to ground.

Compensation network 470 includes a resistor 472 and a capacitor 474. Resistor 472 has a first terminal connected to the output of error amplifier 412 at the COMP terminal, and a second terminal. Capacitor 474 has a first terminal connected to the second terminal of resistor 472, and a second terminal connected to ground.

DC-DC power conversion system 400 is a buck DC-DC converter using an integrated circuit DC-DC converter 410 with several external components. It regulates $V_{OUT}$ to a desired level by providing feedback signal FB using a resistor divider formed by resistors 452 and 454. The voltage control loop is stabilized by a compensation network formed by resistor 472 and capacitor 474. DC-DC converter 410 includes five terminals or pins, including input voltage terminal $V_{IN}$, ground terminal GND, switch node terminal SWN, feedback terminal FB, and compensation terminal COMP. DC-DC converter 410 implements gate charge re-use using driver circuit 420 connected between dead-time control circuit 418 and output power stage 422 and reduces power consumption through charge sharing in the driver.

Figure 5:
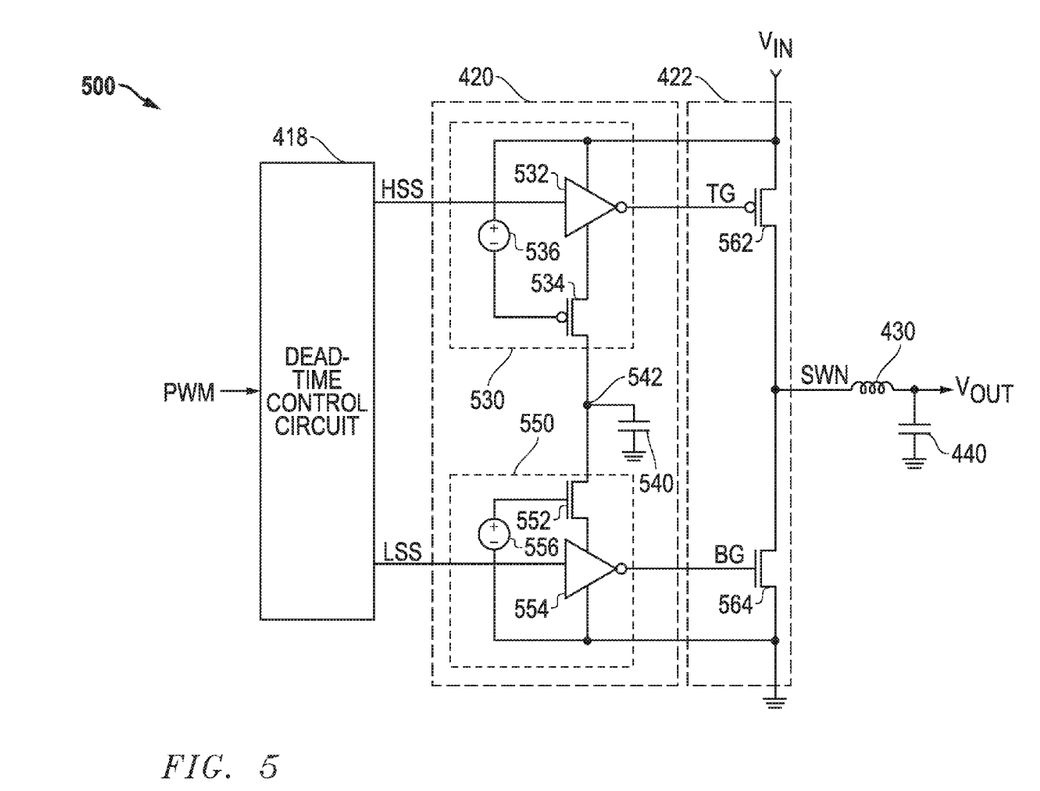
FIG. 5 illustrates in partial block diagram and partial schematic form a portion of a DC-DC converter according to an embodiment of the DC-DC converter of FIG. 4.

FIG. 5 illustrates in partial block diagram and partial schematic form a portion of a DC-DC converter 500 according to an embodiment of DC-DC converter 410 of FIG. 4. DC-DC converter 500 includes dead-time control circuit 418, driver circuit 420, and output power stage 422. Also shown in FIG. 5 is inductor 430 and capacitor 440 providing voltage $V_{OUT}$ to the load, not shown in FIG. 5.

Dead-time control circuit 418 has an input for receiving the PWM signal, a first output for providing the HSS signal, and a second output for providing the LSS signal. Driver circuit 420 includes a high-side driver 530, a capacitor 540, and a low-side driver 550. High-side driver 530 includes a driver 532, a P-channel MOS transistor 534, and a voltage source 536. Driver 532 is an inverting driver having an input for receiving the HSS signal, an output for providing the TG signal, a positive power supply terminal for receiving $V_{IN}$, and a negative power supply terminal. Transistor 534 has a source connected to the negative power supply terminal of driver 532, a gate connected to an intermediate node 542, and a drain. Voltage source 536 has a positive terminal for receiving $V_{IN}$, and a negative terminal connected to the gate of transistor 534. Capacitor 540 has a first terminal connected to intermediate node 542, and a second terminal connected to ground. Low-side driver 550 includes an N-channel MOS transistor 552, a driver 554, and a voltage source 556. Transistor 552 has a drain connected to intermediate node 542, a gate, and a drain. Driver 554 has an input for receiving the LSS signal, an output, a positive power supply terminal connected to the source of transistor 552, and a negative power supply terminal connected to ground. Voltage source 556 has a positive terminal for connected to the gate of transistor 552, and a negative terminal connected to ground.

Output power stage 422 includes transistors 562 and 564. Transistor 562 has a source for receiving voltage $V_{IN}$, a gate connected to the output of driver 532 for receiving signal TG, and a drain connected to the SWN node. Transistor 564 has a drain connected to node SWN and to the drain of transistor 562, a gate connected to the output of driver 554 for receiving signal BG, and a source connected to ground. In DC-DC converter 500, transistors 534, 552, 562, and 564 are implemented as laterally diffused MOS (LDMOS) transistors. LDMOS transistors have lower a threshold voltage and a voltage/current characteristic with a smaller slope than normal MOS transistors.

In DC-DC converter 500, driver circuit 420 includes high- and low-side driver sections that regulate the voltage swing across the gates of LDMOS transistors in output power stage 422 while re-using gate charge. Capacitor 540 is connected to intermediate node 542 and operates as a tank capacitor. Capacitor 540 operates as a charge pump that stores charge as it is removed from the gate of transistor 562 to make transistor 562 conductive, and transfers stored charge onto the gate of transistor 564 to make transistor 564 conductive. Transistors 534 and 552 are also LDMOS transistors that operate as source followers to limit the voltage swing on the gates of the respective transistors 562 and 564 in output power stage 422.

High-side driver 530 provides a voltage swing on the gate of transistor 562 between $V_{DD}$ when HSS is low and TG is high, and a regulated voltage equal to the voltage on the gate of transistor 534 minus the threshold voltage of transistor 534 when HSS is high and TG is low. This voltage swing allows transistor 562 to become fully conductive and biased above its threshold voltage to keep its on resistance low, while also dumping charge onto intermediate node 542 when driver circuit 420 makes transistor 562 conductive.

Similarly, low-side driver 550 provides a voltage swing on the gate of transistor 564 between the voltage at the gate of transistor 552 minus the threshold voltage of transistor 552 when LSS is low and BG is high, and GND when LSS is high and BG is low. This voltage swing allows transistor 564 to become fully conductive and biased above its threshold voltage to keep on resistance low, while drawing charge from intermediate node 542 when driver circuit 420 makes transistor 564 conductive.

In one example, $V_{IN}$ is a battery voltage having a voltage that varies between about 2.5 and about 5.0 volts, $V_{OUT}$ can be programmed to be between about 0.3 volts and 1.35 volts, and LDMOS transistors are built using a process technology that provides them with a threshold voltage of about 0.3 volts and a breakdown voltage of around 5.0 volts. In this case, the voltage drop of each of voltage sources 536 and 556 is set to about 2.1 volts to drive each transistor with a gate-to-source voltage having an absolute value of about 1.8 volts.

Thus DC-DC converter 500 implements gate charge re-use with high- and low-side drivers with regulators formed by a voltage source and a source follower transistor, combined with LDMOS transistors and a tank capacitor. It reduces circuit complexity and saves die area compared to known designs, but also allows for an extended voltage input range. The increased efficiency allows for higher frequency operation.

Figure 6:
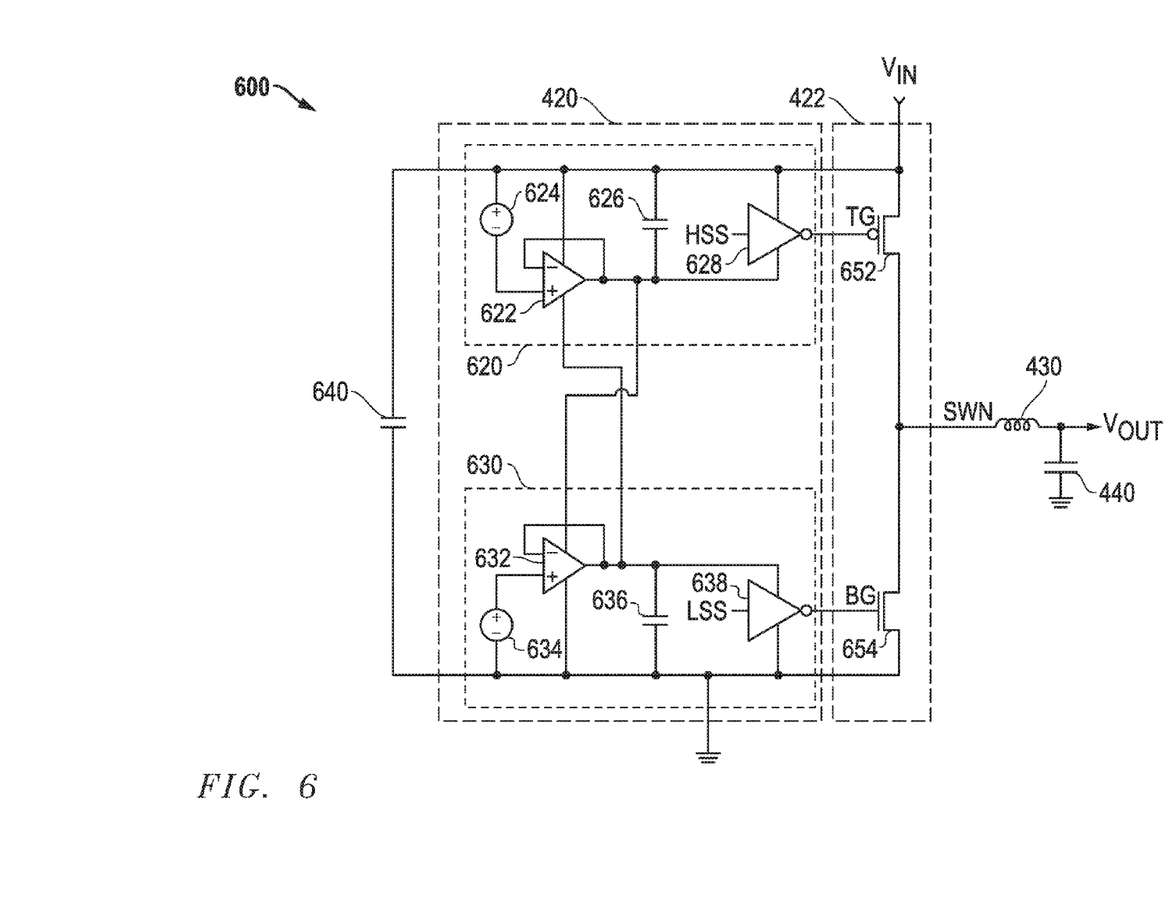
FIG. 6 illustrates in partial block diagram and partial schematic form a portion of a DC-DC converter according to another embodiment of the DC-DC converter of FIG. 4.

FIG. 6 illustrates in partial block diagram and partial schematic form a portion of a DC-DC converter 600 according to another embodiment of DC-DC converter 410 of FIG. 4. DC-DC converter 600 includes driver circuit 420, output power stage 422, inductor 430, capacitor 440, and a capacitor 640.

Driver circuit 420 includes a high-side driver 620 and a low-side driver 630. High-side driver 620 includes an amplifier 622, a voltage source 624, a capacitor 626, and a driver 628. Amplifier 622 has a non-inverting input, an inverting input, an output connected to the inverting input, a positive power supply input for receiving $V_{IN}$, and a negative power supply input. Voltage source 624 has a positive terminal for receiving $V_{IN}$, and a negative terminal connected to the non-inverting input of amplifier 622. Capacitor 626 has a first terminal for receiving $V_{IN}$, and a second terminal connected to the output of amplifier 622. Driver 628 has an input for receiving the HSS signal, an output for providing the TG signal, a positive power supply input for receiving input voltage $V_{IN}$, and a negative power supply voltage terminal connected to the output of amplifier 622. Low-side driver 630 includes an amplifier 632, a voltage source 634, a capacitor 636, and a driver 638. Amplifier 632 has a non-inverting input, an inverting input, an output connected to the inverting input and to the negative power supply terminal of amplifier 622, a positive power supply terminal connected to the output of amplifier 622, and a negative power supply terminal connected to ground. Voltage source 634 has a positive terminal connected to the non-inverting input of amplifier 632, and a negative terminal connected to ground. Capacitor 636 has a first terminal connected to the output of amplifier 632, and a second terminal connected to ground. Driver 638 has an input for receiving the LSS signal, an output for providing the BG signal, a positive power supply terminal connected to the output of amplifier 632, and a negative power supply terminal connected to ground.

Output power stage 422 includes a P-channel LDMOS transistor 652, and an N-channel LDMOS transistor 654. Transistor 652 has a source for receiving $V_{IN}$, a gate connected to the output of driver 628 for receiving the TG signal, and a drain connected to the SWN terminal. Transistor 754 has a drain connected to the SWN terminal, a gate for receiving the BG signal, and a source connected to ground.

Capacitor 640 has a first terminal for receiving $V_{IN}$, and a second terminal coupled to ground. Capacitor 640 is a decoupling capacitor that helps to prevents changes in current from affecting $V_{IN}$.

DC-DC converter 600 uses regulators formed by amplifiers in the unity-gain configuration with storage capacitors to regulate the voltage swing on the output transistors, along with LDMOS transistors in the output stage. High-side driver 620 provides a voltage swing on the gate of transistor 652 between $V_{DD}$ when HSS is low and TG is high, and a regulated voltage equal to $V_{IN}$ minus the voltage drop of voltage source 624 on the gate of transistor 534 when HSS is high and TG is low. This voltage swing allows transistor 562 to become fully conductive and biased above its threshold voltage to keep its on resistance low, while also sharing charge between capacitors 626 and 636. Low-side driver 630 provides a voltage swing on the gate of transistor 654 between a regulated voltage equal to ground plus the voltage drop of voltage source 634 when LSS is low and BG is high, and ground when LSS is high and BG is low. This voltage swing allows transistors 562 and 564 to become fully conductive and biased above the absolute values of their respective threshold voltages to keep their on resistances low, while also sharing charge between capacitors 626 and 636. The voltages of capacitors 626 and 636 are determined by amplifiers 622 and 632 and voltage sources 624 and 634, and are set to be less than $V_{IN}/2$.

Figure 7:
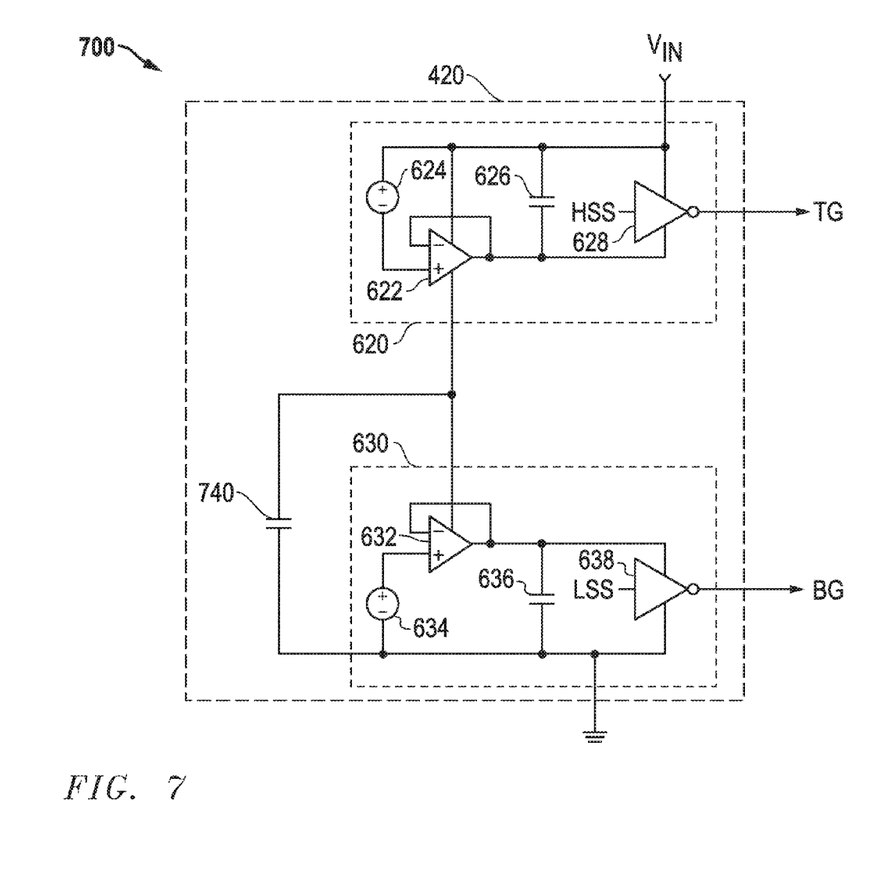
FIG. 7 illustrates in partial block diagram and partial schematic form a portion of a DC-DC converter according to yet another embodiment of the DC-DC converter of FIG. 4.

FIG. 7 illustrates in partial block diagram and partial schematic form a portion of a DC-DC converter 700 according to yet another embodiment of DC-DC converter 410 of FIG. 4. In DC-DC converter 700, driver circuit 420 uses high-side driver 620 and low side driver 630 constructed the same as in DC-DC converter 600 but interconnected differently. In DC-DC converter 700 instead of cross connecting outputs of the amplifiers to opposite amplifier power supply terminals, the negative power supply terminal of amplifier 622 is connected to the positive power supply terminal of amplifier 632 to form an intermediate node. In addition, DC-DC converter 700 has a bias capacitor 740 with a first terminal connected to the intermediate node, and a second terminal connected to ground, to provide charge storage on the intermediate node using a center bias feature.

Thus various embodiments of a DC-DC converter that implement gate charge re-use for power reduction have been described. LDMOS transistors reduce design complexity and save die area. The driver circuit drives the LDMOS transistors into their active states by providing a gate drive voltage intermediate to the power supply rails, allowing extended input voltage range operation.

The above-disclosed subject matter is to be considered illustrative, and not restrictive, and the appended claims are intended to cover all such modifications, enhancements, and other embodiments that fall within the true scope of the claims. For example while various driver circuits using active regulation have been described, others may be used on other embodiments. Moreover while various embodiments using LDMOS transistors were shown and described, the techniques described above are applicable to other transistor types, especially those having gradual voltage/current slopes like LDMOS transistors.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A DC-DC converter comprising:
    a dead-time control circuit having an input for receiving a pulse width modulation signal, a first output for providing a high-side switch signal, and a second output for providing a low side switch signal;
    an output power stage for receiving an input voltage and switching said input voltage to a switch node using a first transistor in response to a top-gate signal received at a top-gate node, and for switching said switch node to ground using a second transistor in response to a bottom-gate signal received at a bottom-gate node; and
    a driver circuit for providing said top-gate signal and said bottom-gate signal in response to said high-side switch signal and said low side switch signal, respectively, said driver circuit activating said top-gate signal using a first regulator that actively regulates said top-gate node to a first voltage between a threshold voltage and a breakdown voltage of said first transistor using charge from said bottom-gate node, and activating said bottom-gate signal using a second regulator that actively regulates a second voltage provided to said bottom-gate node between a threshold voltage and a breakdown voltage of said second transistor using charge from said top-gate node.

2. The DC-DC converter of claim 1 wherein:
    said first transistor has a first current electrode for receiving said input voltage, a control electrode for receiving said top-gate signal, and a second current electrode coupled to said switch node; and
    said second transistor has a first current electrode coupled to said switch node, a control electrode for receiving said bottom-gate signal, and a second current electrode coupled to ground.

3. The DC-DC converter of claim 2 wherein said first and second transistors comprise laterally diffused metal-oxide-semiconductor (LDMOS) transistors.

4. The DC-DC converter of claim 1 wherein said driver circuit comprises:
    a high-side driver coupled between a voltage input terminal and an intermediate node for providing said top-gate signal in response to said high-side switch signal;
    a tank capacitor having a first terminal coupled to said intermediate node, and a second terminal coupled to ground; and
    a low side driver coupled between said intermediate node and ground for providing said bottom-gate signal in response to said low side switch signal.

5. The DC-DC converter of claim 4 wherein said high-side driver comprises:
    a first driver having an input for receiving said high-side switch signal, an output, a positive power supply terminal for receiving said input voltage, and a negative power supply terminal;
    a third transistor having a first current electrode coupled to said negative power supply terminal of said first driver, a control electrode, and a second current electrode coupled to said intermediate node; and
    a first voltage source having a positive terminal for receiving said input voltage, and a negative terminal coupled to said control electrode of said third transistor.

6. The DC-DC converter of claim 5, wherein said first voltage source provides a voltage between said first and second terminals thereof equal to a predetermined voltage plus a threshold voltage of said third transistor.

7. The DC-DC converter of claim 5 wherein said low side driver comprises:
    a fourth transistor having a first current electrode coupled to said intermediate node, a control electrode, and a second current electrode;
    a second driver having an input for receiving said low side switch signal, an output, a positive power supply terminal coupled to said second current electrode of said fourth transistor, and a negative power supply terminal coupled to ground; and
    a second voltage source having a positive terminal coupled to said control electrode of said fourth transistor, and a negative terminal coupled to ground.

8. The DC-DC converter of claim 7, wherein said second voltage source provides a voltage between said first and second terminals thereof equal to a predetermined voltage plus a threshold voltage of said fourth transistor.

9. The DC-DC converter of claim 1 wherein said driver circuit comprises:
    a high-side driver coupled between a voltage input terminal and a first intermediate node for providing said top-gate signal in response to said high-side switch signal; and
    a low side driver coupled between a second intermediate node and ground for providing said bottom-gate signal in response to said low side switch signal.

10. The DC-DC converter of claim 9 wherein said high-side driver comprises:
    a first amplifier having a non-inverting input, an inverting input, an output coupled to said inverting input and to said first intermediate node, and a negative power supply input coupled to said second intermediate node;

a first voltage source having a positive terminal for receiving said input voltage, and a negative terminal coupled to said non-inverting input of said first amplifier;

a first capacitor having a first terminal for receiving said input voltage, and a second terminal coupled to said output of said first amplifier; and a first driver coupled between a voltage input terminal and said first intermediate node for providing said top-gate signal in response to said high-side switch signal.

11. The DC-DC converter of claim 10 wherein said low side driver comprises:

a second amplifier having a non-inverting input, an inverting input, an output coupled to said inverting input and to said second intermediate node, and a positive power supply input coupled to said first intermediate node;

a second voltage source having a positive terminal for receiving said input voltage, and a negative terminal coupled to said non-inverting input of said second amplifier;

a second capacitor having a first terminal coupled to said output of said second amplifier, and a second terminal coupled to ground; and a second driver coupled between said second intermediate node and ground for providing said bottom-gate signal in response to said low side switch signal.

12. The DC-DC converter of claim 1 wherein said driver circuit comprises:

a high-side driver coupled between a voltage input terminal and an intermediate node for providing said top-gate signal in response to said high-side switch signal;

a low side driver coupled between said intermediate node and ground for providing said bottom-gate signal in response to said low side switch signal; and a bias capacitor having a first terminal coupled to said intermediate node, and a second terminal coupled to ground.

13. The DC-DC converter of claim 12 wherein said high-side driver comprises:

a first amplifier having a non-inverting input, an inverting input, an output coupled to said inverting input, and a negative power supply input coupled to said intermediate node;

a first voltage source having a positive terminal for receiving said input voltage, and a negative terminal coupled to said non-inverting input of said first amplifier;

a first capacitor having a first terminal for receiving said input voltage, and a second terminal coupled to said output of said first amplifier; and a first driver coupled between a voltage input terminal and said output of said first amplifier for providing said top-gate signal in response to said high-side switch signal.

14. The DC-DC converter of claim 13 wherein said low side driver comprises:

a second amplifier having a non-inverting input, an inverting input, an output coupled to said inverting input, and a positive power supply input coupled to said intermediate node;

a second voltage source having a positive terminal for receiving said input voltage, and a negative terminal coupled to said non-inverting input of said second amplifier;

a second capacitor having a first terminal coupled to said output of said second amplifier, and a second terminal coupled to ground; and a second driver coupled between said output of said second amplifier and ground for providing said bottom-gate signal in response to said low side switch signal.

15. A DC-DC power conversion system comprising:

an error amplifier having a first input for receiving a feedback signal, a second input for receiving a reference voltage, and an output;

an oscillator having an output for providing a clock signal; and a pulse width modulator having a control input coupled to said output of said error amplifier, a clock input for receiving said clock signal, and an output for providing a pulse width modulator signal;

a dead-time control circuit having an input for receiving a pulse width modulation signal, a first output for providing a high-side switch signal, and a second output for providing a low side switch signal;

an output power stage for receiving an input voltage and switching said input voltage to a switch node using a first transistor in response to a top-gate signal received at a top-gate node, and for switching said switch node to ground using a second transistor in response to a bottom-gate signal received at a bottom-gate node; and a driver circuit for providing said top-gate signal and said bottom-gate signal in response to said high-side switch signal and said low side switch signal, respectively, said driver circuit activating said top-gate signal using a first regulator that actively regulates said top-gate node to a first voltage between a threshold voltage and a breakdown voltage of said first transistor using charge from said bottom-gate node, and activating said bottom-gate signal using a second regulator that actively regulates a second voltage provided to said bottom-gate node between a threshold voltage and a breakdown voltage of said second transistor using charge from said top-gate node.

16. The DC-DC power conversion system of claim 15, wherein said error amplifier, said oscillator, said pulse width modulator, said dead-time control circuit, said driver circuit, and said output power stage are combined in a single monolithic integrated circuit.

17. The DC-DC power conversion system of claim 15, further comprising:

an inductor having a first terminal coupled to said switch node, and a second terminal for providing an output voltage; and a capacitor having a first terminal coupled to said second terminal of said inductor, and a second terminal coupled to ground.

18. The DC-DC power conversion system of claim 15 wherein:

said first transistor has a first current electrode for receiving said input voltage, a control electrode for receiving said top-gate signal, and a second current electrode coupled to said switch node; and said second transistor has a first current electrode coupled to said switch node, a control electrode for receiving said bottom-gate signal, and a second current electrode coupled to ground.

19. The DC-DC power conversion system of claim 18 wherein said first and second transistors comprise laterally diffused metal-oxide-semiconductor (LDMOS) transistors.

20. A method comprising:

receiving a pulse width modulation signal;

providing a high-side switch signal and a low side switch signal with a dead time therebetween in response to said pulse width modulation signal;

driving a top-gate node coupled to a gate of a first transistor in response to said high-side switch signal using a first regulator that actively regulates said top-gate node to a first voltage between a threshold voltage and a breakdown voltage of said first transistor using charge from a bottom-gate node coupled to a gate of a second transistor; and driving said bottom-gate node in response to said low side switch signal using a second regulator that actively regulates said bottom-gate node to a second voltage between a threshold voltage and a breakdown voltage of said second transistor using charge from said top-gate node.

21. The method of claim 20 further comprising:

switching an input voltage to a switch node using said first transistor in response to said driving said top-gate node; and switching said switch node to ground using said second transistor in response to said driving said bottom-gate node.

22. The method of claim 20 further comprising:

forming a tank voltage using a tank capacitor;

clamping a top-gate voltage on said top-gate node to said first voltage using said tank voltage; and clamping a bottom-gate voltage on said bottom-gate node to said second voltage using said tank voltage.

23. The method of claim 20 wherein:

driving said top-gate node comprises driving a gate of a first LDMOS transistor; and driving said bottom-gate node comprises driving a gate of a second LDMOS transistor.

\* \* \* \* \*